United States Patent [19]

Watarai et al.

[11] 4,229,510
[45] Oct. 21, 1980

[54] PHOTOCONDUCTIVE POLYMER MATERIAL OF N-ALKYLPHENOTHIAZINE AND FORMALDEHYDE

[75] Inventors: Syu Watarai; Kenichi Sawada; Takeshi Saida, all of Asaka, Japan

[73] Assignee: Fuji Photo Film Co., Ltd., Minami-ashigara, Japan

[21] Appl. No.: 33,630

[22] Filed: Apr. 26, 1979

[30] Foreign Application Priority Data

Apr. 26, 1978 [JP] Japan .................................. 53/49459

[51] Int. Cl.² ............................................. G03G 5/07
[52] U.S. Cl. ....................................... 430/38; 430/77; 528/251; 430/78
[58] Field of Search ....................... 430/76, 77, 78, 80; 528/251

[56] References Cited

U.S. PATENT DOCUMENTS 3,770,428  11/1973  Watarai et al. ......................... 430/80
3,914,194  10/1975  Smith ..................................... 528/251
4,038,468   7/1977  Egorovna .............................. 430/77

Primary Examiner—Roland E. Martin, Jr.
Assistant Examiner—John L. Goodrow
Attorney, Agent, or Firm—Sughrue, Rothwell, Mion, Zinn and Macpeak

[57] ABSTRACT

A photoconductive polymer material having the following repeating unit:

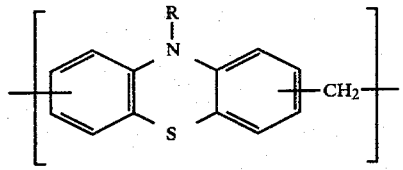

wherein R represents an alkyl group is disclosed.

2 Claims, No Drawings

PHOTOCONDUCTIVE POLYMER MATERIAL OF N-ALKYLPHENOTHIAZINE AND FORMALDEHYDE

BACKGROUND OF THE INVENTION

1. Field of the Invention

This invention relates to a new photoconductive polymer material.

2. Discussion of the Prior Art

A vast variety of high-molecular weight compounds have been reported to have photoconductive properties. Such compounds include, for example, a resinous material resulting from the condensation of a saturated aliphatic aldehyde with a primary aromatic amine as described in U.S. Pat. No. 3,244,517, a resinous material manufactured by the condensation of an aromatic amine containing a conjugated heterocyclic nucleus with an unsaturated aldehyde, acrolein or an alkyl-substituted acrolein as described in U.S. Pat. No. 3,163,531, a relatively low molecular weight polycondensation product of formaldehyde or para-formaldehyde and anthracene or an N-alkylcarbazole, as set forth in U.S. Pat. No. 3,240,597, a product resulting from the condensation of N-β-chloroethylcarbazole with formaldehyde or para-formaldehyde as set forth in U.S. Pat. No. 3,770,428, poly-N-vinylcarbazole as set forth in U.S. Pat. No. 3,037,861, etc.

Among these, only poly-N-vinylcarbazole has been applied to commercial products because it exhibits a relatively high level of photoconductivity and is readily synthesized with comparatively low production cost. Even this compound has many shortcomings including still insufficient photoconductivity and in particular too high a softening point. The latter property leads to a coated film with an unacceptable fragilness.

U.S. Pat. No. 3,240,597 and Japanese Patent Publication 5585/1967 (corresponding to British Pat. No. 1,021,994) disclose an organic photoconductive composition based on a resinous material prepared by condensing an N-alkylcarbazole such as N-ethylcarbazole with formaldehyde; however, such an N-alkylcarbazole-formaldehyde resin exhibits very limited solubilities in common organic solvents, and has too high a softening point to give rise to a coated film with good mechanical strength. Such deficiencies are reflected in the fact that an image obtained by photo-electrophoresis (see, for example, Japanese Patent Publication 21781/1968, U.S. Pat. Nos. 3,383,993, 3,384,488, 3,384,565, 3,384,566, 3,510,419, 3,565,614, 3,615,558, 3,655,370 and 3,681,064, and British Pat. Nos. 1,124,625, 1,124,626 and 1,185,931), photo migration process (see, for example, U.S. Pat. No. 3,520,681), or manifold process (see, for example, Japanese Patent Publication 8118/1972, corresponding to British Pat. No. 1,214,731) using a finely divided photoconductive particulate comprising one of these photoconductive resinous materials must be fixed only at a very high temperature exceeding its softening point, giving a fixed image with an insufficient mechanical strength.

SUMMARY OF THE INVENTION

A principal object of the present invention is to provide a novel polymer exhibiting excellent photoconductivity and which is capable of providing an electrophotographic element having good mechanical strength.

Another object of the present invention is to provide a polymer having a relatively low softening point.

Still another object of the present invention is to provide a photoconductive polymer which can be formed into a particulate photoconductor which is capable of being fixed at a relatively low temperature to yield an image with good mechanical strength.

A further object of the present invention is to provide a photoconductive polymer having a repeating unit of the formula:

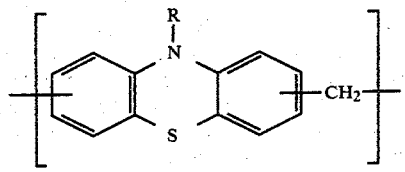

wherein R represents an alkyl group, which is a relatively high speed photoconductive material.

As a result of extensive studies to overcome the problems encountered with conventional photoconductive polymers, a new polymer material exhibiting excellent photoconductivity has been discovered having the following repeating unit produced through the reaction of an N-alkylphenothiazine with formaldehyde.

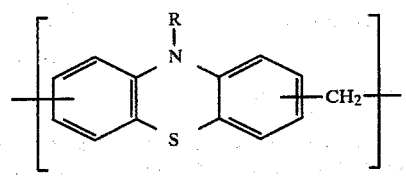

In the formula R represents an alkyl group.

DETAILED DESCRIPTION OF THE INVENTION

The polymer material characterizing the present invention generally has about 2 to 100 and preferably 2 to about 20 repeating units of the above formula.

The polymer material characterizing the instant invention can be synthesized by heating an N-alkylphenothiazine with a compound which can release or form formaldehyde at least during reaction in the presence of an acid catalyst dissolved in an organic solvent. An N-alkylphenothiazine in turn can be prepared by the reaction of phenothiazine with a halogenated alkyl compound according to the method reported by A. Burger and A. C. Schmalz in *Journal of Organic Chemistry*, Vol. 19, p. 1841 (1954) as illustrated in the synthesis examples below. Unless otherwise indicated, all parts, percents, ratios, etc., are by weight.

SYNTHESIS EXAMPLE 1

Preparation of N-methylphenothiazine

Into about 250 ml dimethyl sulfoxide was added piece by piece 12 g metallic sodium under stirring and with a supply of nitrogen gas, and the system was kept at 35° C. with stirring for 7 hours to slowly dissolve the sodium. Then, after the system temperature was raised to 40° C., 50 g phenothiazine was added, and after 20 minutes stirring, 71 g (0.5 mol) methyl iodide was further introduced dropwise through a funnel over a period of 30 minutes. After an additional 4 hour stirring at 40° C., the whole volume of the reaction system was poured into 2 liters of water whereupon the reaction product precipitated. After separation by filtration and rinsing with water, the precipitate was recrystallized from a mixture comprising ethanol and acetone in a volume ratio of 4 to 1. A pale yellow rod-shaped crystalline product was obtained which weighed 39 g with a melting point of 102° C. Elemental analysis proved that the crystal comprised of N-methylphenothiazine.

SYNTHESIS EXAMPLES 2 TO 5

Using ethyl iodide, propyl iodide, butyl iodide or hexyl iodide in place of the methyl iodide in the foregoing example in an amount of 0.5 mol, and otherwise repeating the procedures in Synthesis Example 1, the corresponding N-alkylphenothiazines were prepared.

Table 1 summarizes the yield and the results of elemental analysis for each example.

TABLE 1

| R* | Melting Point or Boiling Point (°C.) | Yield (%) | Elemental Analysis | | |
|---|---|---|---|---|---|
| | | | C | H | N |
| $CH_3$ | 102 | 72 | 73.20 (73.11)** | 5.12 (5.20) | 6.55 (6.57) |
| $C_2H_5$ | 104 | 77 | 74.06 (73.97) | 5.68 (5.76) | 6.29 (6.16) |
| $C_3H_7$ | 160–161/$10^{-2}$ mm | 61 | 73.95 (74.65) | 6.26 (6.26) | 5.67 (5.80) |
| $C_4H_9$ | 162–166/$10^{-2}$ mm | 65 | 74.37 (75.25) | 6.77 (6.71) | 5.52 (5.49) |
| $C_6H_{13}$ | 146–147/$10^{-2}$ mm | 51 | 75.81 (76.28) | 7.56 (7.47) | 4.93 (4.94) |

*Straight chain alkyl groups
**Values in the parentheses are calculated.

Desirable photoconductive properties are exhibited by the photoconductive polymeric material of the instant invention when the R group is a straight chain, branched chain or cyclic alkyl group having from 1 to 14 carbon atoms and preferably from 1 to 6 carbon atoms. Accordingly, the N-alkylphenothiazine as raw material should have a corresponding number of carbon atoms in the alkyl group. Suitable examples of branched alkyl groups which can be used include an isopropyl group, an isobutyl group, an isoamyl group, an isohexyl group, a sec-butyl group, a tert-butyl group, a tert-pentyl group, a neopentyl group, etc. Suitable examples of cyclic alkyl groups which can be used are a cyclohexyl group, and suitable examples of straight alkyl groups which can be used are those having 1 to 6 carbon atoms. Usually the polymers of the instant invention have a softening point of about 30° C. to 100° C. which is preferred.

The other ingredient required for the synthesis of the photoconductive polymeric material of the instant invention is formaldehyde. Since the essential requirement is that the reaction system contains formaldehyde in a form which reacts with the N-alkylphenothiazine, suitable raw materials for the synthesis include, in addition to formaldehyde itself, para-formaldehyde and trioxane which are capable of releasing formaldehyde upon decomposition. Still other materials may be employed which are capable of forming formaldehyde in the reaction system.

The reaction between the N-alkylphenothiazine and formaldehyde is usually carried out in an organic solvent. Suitable solvents include benzene, dioxane, etc., each of which may contain water.

Suitable acid catalysts include hydrochloric acid, sulfuric acid, acetic acid, nitric acid and other organic and inorganic acids, which can be used in trace amounts. The molar ratio of the N-alkylphenothiazine to formaldehyde in the reaction system should be 1:1 or more. In other words, formaldehyde should always be used in excess of the N-alkylphenothiazine. The sum of the two ingredients ordinarily amounts to from 5 to 50% by weight of the solvent used. Though it is not a necessary condition to heat the reaction system during reaction, one can promote the reaction by raising the temperature, for example, from 40° C. to 100° C.

In the following, practical examples of the production of the photoconductive polymeric materials of the instant invention will be described for better understanding of the invention.

EXAMPLE 1

In 150 ml dioxane were dissolved 20.2 g N-ethylphenothiazine and 3 g para-formaldehyde. To the resulting solution, 0.5 g concentrated sulfuric acid was added as a reaction catalyst. After 5 hour agitation at 90° C., the whole volume was poured into ethanol while being vigorously agitated whereby a resinous reaction product deposited. The reaction product was dissolved in tetrahydrofuran and reprecipitated with methanol. The product thus-purified was dried to give about 15.6 g of the resinous product. Yield 65%.

Measurement of molecular weight by gel permeation chromatography gave a number average polystyrene equivalent value ($\overline{M}_n$) of 610 and a weight average polystyrene equivalent value ($\overline{M}_w$) of 1250.

EXAMPLES 2 TO 5

For each of these examples, N-methyl, N-propyl, N-butyl, or N-hexyl substituted phenothiazine was used in place of N-ethylphenothiazine of Example 1, and otherwise the procedures were repeated. A corresponding reaction product was obtained in each case.

The yield and the results of molecular weight analyses are summarized in Table 2.

TABLE 2

| Resin No. | N-Substituent | Yield (%) | $M_n$ | $M_w$ |
|---|---|---|---|---|
| (I) | $CH_3$ | 77 | 380 | 780 |
| (II) | $C_2H_5$ | 65 | 610 | 1250 |
| (III) | $C_3H_7$ | 58 | 890 | 1420 |
| (IV) | $C_4H_9$ | 34 | 4480 | 19700 |
| (VI) | $C_6H_{13}$ | 7 | 1430 | 2670 |

Comparison of Electrophotographic Properties

Next, in order to show the excellence of the organic photoconductive materials prepared in accordance with the instant invention, the photoconductive properties were compared with those of poly-N-vinylcarbazole, a representative example of conventional materials.

An electrophotographic member was prepared from each of the resins (I), (II), (IV) and (VI) shown in Table 2 by coating a 10% toluene solution thereof on an aluminum plate to give a dried thickness of 10 μm. A comparative sample was prepared by coating a 10% by weight solution ofpoly(N-vinylcarbazole) having a number average molecular weight of 430,000 on an aluminum substrate and drying. Each of the members was subjected to negative and positive corona discharge, and uniformly irradiated with a 100 w incandescent lamp. The measured value of the exposure amount required for half-decay of the initial surface potential is shown in Table 3.

TABLE 3

| Sample | Resin No. | R | Positive Charging | | Negative Charging | |
|---|---|---|---|---|---|---|
| | | | Initial Potential (v) | Half-Decay Exposure (lux-sec) | Initial Potential (v) | Half-Decay Exposure (lux-sec) |
| Instant Invention | (I) | $CH_3$ | 600 | 2880 | −925 | 6300 |
| Instant Invention | (II) | $C_2H_5$ | 380 | 3420 | −155 | 7200 |
| Instant Invention | (IV) | $C_4H_9$ | 270 | 5940 | −95 | 18800 |
| Instant Invention | (VI) | $C_6H_{13}$ | 740 | 1980 | −290 | 28800 |
| Comparative | Poly(N-vinyl-carbazole) | | 760 | 45000 | −750 | 54000 |

As is seen from the results in Table 3, it is evident that the photoconductive materials of the instant invention have better photoconductivities than poly(N-vinylcarbazole). Though the electrophotographic speed decreases as the chain length of the alkyl group increases for negative charging, the speed for positive charging exhibits a different dependence on the alkyl chain length such that maximum speed is obtained with $R=C_6H_{13}$.

Measurement of Softening Point

The softening points of the synthesized polymers were measured, since it has a marked influence on the mechanical and physical properties of the resin. The sample material in powder form was sandwiched between a pair of glass plates. The temperature of the thus-arranged assembly was gradually raised while pressure was applied from above until the sample powder melted to form a transparent layer. Such a softening point method was performed by use of a Micro Melting Point Apparatus, manufactured by Yanagimoto Manufacturing Co. Again poly(N-vinylcarbazole) (PVK) was used for comparison. The results are shown in Table 4.

TABLE 4

| | Resin No. | R | Softening Point (°C.) |
|---|---|---|---|
| Instant Invention | (I) | $CH_3$ | 40–78 |
| Instant Invention | (II) | $C_2H_5$ | 38–89 |
| Instant Invention | (III) | $C_3H_7$ | 35–88 |
| Instant Invention | (IV) | $C_4H_9$ | 80–91 |
| Instant Invention | (VI) | $C_6H_{13}$ | 30–42 |
| Comparative | PVK | | 130–158 |

As is evident from these measurements, the polymer materials of the instant invention can be favorably adapted to provide photoconductive fine particles as well as a continuous film, since they can be easily fixed at a relatively low temperature range to yield an image with sufficient mechanical strength owing to their low softening points (particularly as the alkyl chain length increases). Thus, they are excellently adapted for the manufacture of electrophotographic light-sensitive elements, whereby they can be incorporated with a variety of sensitizers such as spectral sensitizing dyes and electron acceptors, or be combined with other additives or binder materials in a manner well known to those of ordinary skill in the art.

Below the use of the photoconductive polymer materials prepared in accordance with the instant invention as an electrophotographic element is described in more detail.

A solution of the polymer material of the instant invention is spread on a conductive substrate such as a metal plate, paper or a plastic film provided with a conductive surface layer so as to give a dried thickness of from about 2 to 20 μm, and thoroughly dried. The resulting electrophotographic element is, according to the usual manner, electrostatically charged in darkness, subjected to imagewise exposure, and applied with a cascade developer or liquid toner to obtain a visible image.

Suitable supporting materials on which the photoconductive polymer material of this invention can be coated include any of a wide variety of electrically conducting supports, for example, paper (at a relative humidity above 20%); aluminum-paper laminates; metal foils such as aluminum foil, zinc foil; metal plates, such as aluminum, copper, zinc, brass and galvanized plates; vapor deposited metal layers such as silver, nickel, aluminum coated on paper or conventional photographic film bases such as cellulose acetate, polystyrene. Such conducting materials as nickel can be vacuum deposited on transparent film supports in sufficiently thin layers to allow electrophotographic elements prepared therewith to be exposed from either side of such elements.

An especially useful conducting support can be prepared by coating a support material, such as poly(ethylene terephthalate), with a conducting layer containing a semiconductor dispersed in a resin. Such conducting layers both with and without electrical barrier layers are described in U.S. Pat. Nos. 3,245,833 by Trevoy, and Dessauer, 2,901,348. Other useful conducting layers include compositions consisting essentially of an intimate mixture of at least one protective inorganic oxide and from about 30 to about 70% by weight of at least one conducting metal, e.g., a vacuum-deposited cermet conducting layer as described in Rasch, U.S. Patent Application Ser. No. 486,284, filed July 8, 1974 now U.S. Pat. No. 3,880,657.

Likewise, a suitable conducting coating can be prepared from the sodium salt of a carboxyester lactone of maleic anhydride and a vinyl acetate polymer. Such kinds of conducting layers and methods for their optimum preparation and use are disclosed in U.S. Pat. Nos. 3,007,901 by Minsk, and 3,262,807 by Sterman et al. Likewise, a suitable conducting coating can be prepared from the sodium salt of a carboxyester lactone of maleic anhydride and a vinyl acetate polymer. Such kinds of conducting layers and methods for their optimum preparation and use are disclosed in U.S. Pat. Nos. 3,007,901 by Minsk, and 3,262,807 by Sterman et al.

Coating thickness of the single layer photoconducting polymer material of the invention, when coated on a suitable support, can vary widely. Normally, the resultant dry thickness of the coating is preferably between about 2 microns and about 50 $\mu$m, although useful results can be obtained with a dry coating thickness between about 1 and about 200 $\mu$m, although useful results can be obtained outside of this range.

The photoconductive polymer material according to the invention can be sensitized by the addition of amounts of sensitizing compounds effective to provide improved electrophotosensitivity. Sensitizing compounds useful with the photoconductive polymer materials of the present invention can be selected from a wide variety of materials, including such materials as pyrylium dye salts including thiapyrylium dye salts and selenapyrylium dye salts disclosed in Van Allan et al U.S. Pat. No. 3,250,615; fluorenes, such as 7,12-dioxo-13-dibenzo(a,h)fluorene, 5,10-dioxo-4a,11-diazobenzo(b)fluorene, 3,13-dioxo-7-oxadibenzo(b,g)fluorene, and the like; aromatic nitro compounds of the kinds described in U.S. Pat. No. 2,610,120; anthrones like those disclosed in U.S. Pat. Nos. 2,670,284; quinones, 2,670,286; benzophenones, 2,670,287; thiazoles, 3,732,301; mineral acids; carboxylic acids, such as maleic acid, dichloroacetic acid, trichloroacetic acid and salicylic acid, sulfonic and phosphoric acids, and various dyes, such as cyanine (including carboxyanine), merocyanine, diarylmethane, thiazine, azine, oxazine, xanthene, phthalein, acridine, azo, anthraquinone dyes and the like and mixtures thereof. The sensitizers preferred for use with the polymers of this invention are selected from pyrylium salts including selenapyrylium salts and thiapyrylium salts, and cyanine dyes including carbocyanine dyes.

The polymer material of this invention can also be used as a dispersion in a photoelectrophoresis photographic imaging process as described in, for example, Japanese Patent Publication 21781/1968, U.S. Pat. Nos. 2,758,939, 2,940,847, 3,384,488, 3,615,558, etc. The photosensitive particles may be dispersed simply as a dry powder between the two spaced electrodes and then subjected to a typical electrophoretic migration imaging operation such as that described in U.S. Pat. No. 2,758,939. However, it is more usual to disperse the photosensitive particles in an electrically insulating carrier such as an electrically insulating liquid, or an electrically insulating liquefiable matrix, such as heat- and/or solvent-softenable polymer or a thixotropic polymer. When such a dispersion of photosensitive particles and electrically insulating carrier is used between the spaced electrodes of an electrophoretic migration imaging system, it is conventional to employ from 0.05 part to 2.0 parts of the photosensitive particles for each 10 parts by weight of the electrically insulating carrier.

The carrier may comprise an electrically insulating liquid such as decane, paraffin, Sohio Oderless Solvent 3440 (a kerosene fraction marketed by the Standard Oil Company, Ohio), various isoparaffinic hydrocarbon liquids such as those sold under the trademark Isopar G by Exxon Corporation and having a boiling point in the range of 145° C. to 186° C., various halogenated hydrocarbons such as carbon tetrachloride, trichloromonofluoromethane, various alkylated aromatic hydrocarbon liquids such as the alkylated benzenes, for example, xylenes, and other alkylated aromatic hydrocarbons such as are described in U.S. Pat. No. 2,899,335. An example of one such suitable alkylated aromatic hydrocarbon liquid which is commercially available is Solvesso 100 made by Exxon Corporation. Solvesso 100 has a boiling point in the range of from 157° C. to 177° C. and is composed of 9% xylene, 16% of other monoalkyl benzenes, 34% dialkylbenzenes, 37% trialkylbenzenes, and 4% aliphatics.

Photosensitive particles which are useful in this process are those having an average particle size ranging from about 0.01 $\mu$m to about 100 $\mu$m, preferably about 0.05 $\mu$m to about 20 $\mu$m.

In another embodiment, the polymer material is used as finely divided particles. A particulate photoconductor can be prepared by dissolving the polymer material by itself or in combination with a sensitizing agent in an amount not exceeding 50% by weight of the polymer in a relatively volatile solvent such as, for example, dichloromethane, dichloroethane, chloroform, benzene, etc., which can dissolve both of the ingredients, and pouring the thus-prepared solution into an electrically insulating petroleum solvent such as hexane, heptane, kerosene, isoparaffin, etc., whereby particles of the photoconductive composition separate out with a diameter of from about 0.05 to about 20 $\mu$m.

Some examples of application to electrophotography of the photoconductive polymer material of the instant invention will now be described to illustrate the properties thereof more in detail.

EXAMPLE 1

A 10% by weight toluene solution of Resin (IV) in Table 2 above was spread on an aluminum plate to yield a dried film with 10 $\mu$m thickness. The dried sample thus-prepared was subjected to corona discharge (6 kv) in the dark at a positive surface potential of 270 volts, and exposed to a 100 w incandescent lamp placed 30 cm away for 0.5 second through a positive transparency superimposed on the sample. Thus an electrostatic latent image was formed on the coated film.

Then, by applying a developer comprising glass beads of 0.5 mm diameter coated with nitro cellulose mixed with a fine toner powder comprising an equal weight of polystyrene and carbon black, the electrostatic latent image was developed to give a clear and distinct, optically positive toner image reproducing faithfully the original image.

EXAMPLE 2

A 0.05% by weight dichloromethane solution of Resin (VI) set forth in Table 2 was prepared, to which Rhodamine B was added in an amount corresponding to 1% by weight of the resin. The resulting solution was added dropwise into Isopar H (a petroleum solvent available from Esso Standard Oil Co.) with stirring. A dispersion containing finely divided particles of the resin was obtained. The concentration of the resin in this dispersion was 0.6% by weight, and the average particle size was 0.5 $\mu$m.

According to the method set forth in Japanese Patent Publication 21781/1968, photoelectrophoretic imaging process was carried out using this dispersion. The injection electrode was NESA glass, while the blocking electrode comprised a poly(ethylene terephthalate) film 25 micron thick one surface of which had a 0.5 $\mu$m thick electroconductive layer formed by coating "ECR-34" (a 30 weight % aqueous solution of poly(vinylbenzyltrimethylammonium chloride), a product of Dow Chemical Co., U.S.A.) and the other surface of which had a 3 micron thick poly(vinyl acetate) layer provided by coating a 10 weight % ethanol solution thereof followed by drying. This processed film was wound around a metallic roller in such a manner that the electroconductive resin treated surface was in contact engagement with the roller surface. Over the conductive side of the NESA glass, the above-described dispersion was spread. Then, under the application of +1.0 volt to the metallic roller (relative to the injection electrode), and with the projection of an image through the injection electrode using a 300 w tungsten incandescent halogen lamp, the metallic roller was moved on the dispersion by rotation in such a manner that the distance between the glass surface and the poly(vinyl acetate) coated film surface was maintained at 10 μm. By this procedure, a colored negative image deposited on the poly(vinyl acetate) coated surface of the film wound around the metallic roller.

EXAMPLE 3

To a 0.05 weight % dichloromethane solution of Resin (II) in Table 2 was added Methylene Blue (C.I. 52015) in an amount corresponding to 20% by weight of the resin. The resulting solution was added to "Isopar H" dropwise under agitation to form a dispersion containing dye sensitized resin particles. The dispersion contained 0.6% by weight of the resin solid and the average particle size was 0.3 μm.

The same procedures were repeated as in Example 2 and a sharp colored photoelectrophoretic image was obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic element comprising a substrate having thereon a conductive surface and a layer of a polymer having a repeating unit of the formula:

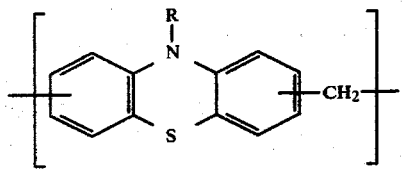

wherein R represents an alkyl group having from 1–14 carbon atoms.

2. A particulate photoconductor comprising a particles of a photoconductive polymer having a repeating unit of the formula:

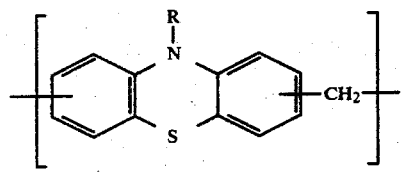

wherein R represents an alkyl group having from 1–14 carbon atoms dispersed in an electrically insulating carrier.

* * * * *